Feb. 7, 1939.   L. S. SANDERS   2,146,653
CAMERA COPY AND MEDIUM FOR USE IN PREPARING SAME
Filed Sept. 8, 1936
Fig. 1
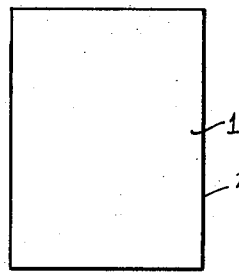
Fig. 2
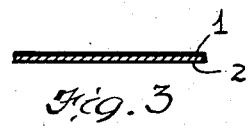
Fig. 3
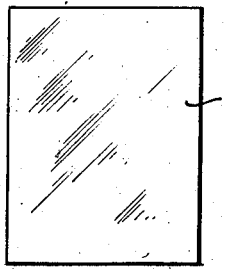
Fig. 4
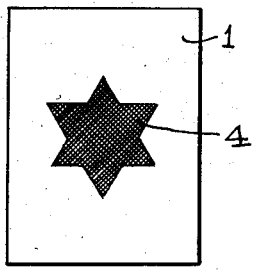
Fig. 6
Fig. 5
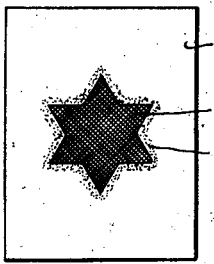
Fig. 7
INVENTOR.
Louis S. Sanders
BY Fay, Oberlin & Fay
ATTORNEYS.

Patented Feb. 7, 1939

2,146,653

UNITED STATES PATENT OFFICE 2,146,653

CAMERA COPY AND MEDIUM FOR USE IN PREPARING SAME

Louis S. Sanders, Lakewood, Ohio

Application September 8, 1936, Serial No. 99,697

3 Claims. (Cl. 41—41)

This invention relates as indicated to camera copy and to a medium for use in preparing the same.

At the present time, a medium is used for making camera copy which comprises drawing board or paper, the surface of which contains an invisible print of a Ben Day or half-tone pattern, which may be rendered visible by the application to such surface of a suitable agent. In using this medium for preparing camera copy, an image is drawn by an artist upon the surface containing the invisible pattern and portions of the invisible pattern are rendered visible to form a background or shading for such image.

It is a primary object of the present invention to provide a medium of the aforesaid character, upon the surface of which an image, instead of being drawn or similarly produced, as described, may be produced photographically.

Another object of the invention is to provide such a medium and a method for using the same which would be capable of substantially reducing the cost and time previously required for making reproductions of combined photographic images and Ben Day or half-tone shadings or patterns.

A further object of the invention is to provide a method of making or preparing camera copy by the use of such a medium.

To the accomplishment of the foregoing and related ends, said invention, then, consists of the means hereinafter fully described and particularly pointed out in the claims.

The annexed drawing and the following description set forth in detail one method and one product exemplifying my invention, such disclosed procedure and product constituting, however, but one of various applications of the principles of my invention.

In said annexed drawing:

Fig. 1 is a view of the surface of a sheet of drawing board of paper containing a print of a Ben Day or half-tone pattern;

Fig. 2 is a view similar to Fig. 1, but in which the pattern has been rendered invisible;

Fig. 3 is a cross-sectional view of the sheet shown in Fig. 2;

Fig. 4 is a view similar to Figs. 1 and 2, but in which a coating of a light-sensitive emulsion has been applied to the surface of the sheet;

Fig. 5 is a cross-sectional view of the sheet shown in Fig. 4;

Fig. 6 is a view of the sheet shown in Fig. 4, but having a photographic print of an image thereon; and Fig. 7 is a view similar to Fig. 6, but in which the image has been embellished by portions of the Ben Day pattern to provide camera copy.

Referring more particularly to the drawing, there is illustrated in Fig. 1, the surface 1 of a sheet of drawing board or paper 2, said surface containing a print of a Ben Day pattern, consisting in this case of a multiplicity of closely spaced tiny dots, lines, stipples or any other similar pattern suitable for backgrounding or shading an image produced on such surface.

This pattern may be produced photographically, as described in Baker Patent No. 1,709,600, may be imprinted on the paper as described in Maier et al. Patent No. 1,778,397, or may be produced in any other known manner.

In any event, the image is first rendered invisible, as by the use of a bleaching agent, such as mercuric chloride, as described in the aforesaid Baker patent, or by the use of a sulphuric acid solution, as described in the aforesaid patent to Maier et al. or in any other desired manner. A sheet, the surface of which contains the invisible image is illustrated in Figs. 2 and 3 of the drawing.

After the Ben Day pattern has thus been rendered invisible, the surface of the sheet 1 which contains the invisible pattern is coated with a suitable light-sensitive emulsion 3, such for example as is commonly used for coating Van Dyke or blueprint paper, such emulsions containing in general complex silver compounds and/or iron salts. The sheet of paper thus coated is illustrated in Figs. 4 and 5. This sheet forms the medium, upon which an image, instead of being drawn or similarly produced, may be produced photographically.

For this purpose, a negative containing a half-tone or other image is placed on the surface 3 of the sheet, the sheet and negative are placed in a suitable contact frame, and the negative and sheet exposed to light for a short period, i. e., about two minutes. In this way, an image 4, as shown in Fig. 6, is produced on the sheet. The portions of the light sensitive emulsion which have not been affected by the exposure to light are removed from the sheet, as by washing or rinsing the sheet in clean water, leaving only the image 4, which in this case is a half-tone image of a star, and a background consisting of the original surface 1 which still contains the invisible Ben Day pattern.

It will be understood that the washing or rinsing is continued for a period sufficient to develop the image 4 but not sufficient to render the Ben Day pattern visible. Instead of washing or rinsing in water, any solution may be used which will develop the image 4 but will not render the Ben Day pattern visible.

After the sheet is dried, selected portions or areas of the Ben Day pattern may be rendered visible to form a background or shading 5 for the image 4, as clearly shown in Fig. 7. If so desired, the intensity of the half-tone image 4 may also be increased by rendering visible the invisible pattern which it overlies. For this purpose suitable developing agents such as a solution of caustic soda may be used as in the aforesaid Baker patent or a solution containing hypo and sodium sulphide or a solution of a sulphide as described in the aforesaid Maier et al. patent.

The product shown in Fig. 7 constitutes the camera copy which may be utilized for advertising purposes, and in the engraving and photo-lithographing arts. The camera copy reproduction medium embodying my above described invention is also well adapted to be used for purposes of reduction, where an original copy is desired to be reduced to different size photoengraving or photolithographing cuts. In such reduction, the Ben Day pattern will be automatically reduced in proportionate size on photographic reproduction, and the necessity for selecting different sizes of Ben Day patterns to accompany the final size of reduction, as heretofore required, is eliminated.

Other modes of applying the principle of my invention may be employed instead of the one explained, change being made as regards the product and method herein disclosed, provided the step or steps stated by any of the following claims or the equivalent of such stated step or steps be employed.

I therefore particularly point out and distinctly claim as my invention:

1. A medium for use in preparing camera copy, said medium comprising a paper sheet having on one surface thereof an invisible Ben Day or halftone pattern consisting of a chemical compound, said pattern capable of being rendered visible by chemical treatment, and a coating of light sensitive material on said surface of the sheet, said coating covering substantially the entire said surface of said sheet and being adapted for the production of a photographic image.

2. The method of preparing camera copy which comprises applying a chemical to the surface of a sheet containing a visible Ben Day or halftone pattern capable of being rendered invisible to render said pattern invisible, applying to said surface a light sensitive emulsion suitable for forming a photographic image, photographically reproducing thereon an image, removing the portions of said emulsion not utilized in forming said image and then developing portions of said pattern to render the same visible so as to form a background or shading for said image.

3. The method of preparing camera copy which comprises applying to a surface containing an invisible Ben Day or halftone pattern capable of being rendered visible a coating of a light sensitive emulsion suitable for forming a photographic image, photographically reproducing thereon an image, removing portions of said emulsion not utilized in forming said image, and then developing portions of said pattern to visibility to provide a background or shading for said image.

LOUIS S. SANDERS.